(12) United States Patent
Cao

(10) Patent No.: US 8,230,737 B2
(45) Date of Patent: Jul. 31, 2012

(54) GRAVITY SENSOR AND ELECTRONIC DEVICE USING THE SAME

(75) Inventor: Shuai Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 929 days.

(21) Appl. No.: 12/264,264

(22) Filed: Nov. 4, 2008

(65) Prior Publication Data

US 2009/0293612 A1 Dec. 3, 2009

(30) Foreign Application Priority Data

May 30, 2008 (CN) .......................... 2008 1 0301879

(51) Int. Cl.
*G01V 7/00* (2006.01)
(52) U.S. Cl. ...................... 73/382 R; 73/488
(58) Field of Classification Search ................ 73/382 G, 73/382 R, 383

See application file for complete search history.

(56) References Cited

U.S. PATENT DOCUMENTS

| | | | | |
|---|---|---|---|---|
| 2,367,268 A * | 1/1945 | Edelmann | | 73/448 |
| 4,271,702 A * | 6/1981 | Manson | | 73/382 R |
| 4,290,307 A * | 9/1981 | Manson | | 73/382 R |
| 4,399,693 A * | 8/1983 | Gournay | | 73/152.06 |
| 4,419,891 A * | 12/1983 | Browning | | 73/382 G |
| 4,475,386 A * | 10/1984 | Fitch et al. | | 73/382 R |
| 4,513,618 A * | 4/1985 | Lautzenhiser | | 73/382 G |
| 4,602,508 A * | 7/1986 | Fitch et al. | | 73/382 G |
| 4,648,273 A * | 3/1987 | Ozols | | 73/382 R |
| 4,756,191 A * | 7/1988 | Manson | | 73/382 R |
| 4,809,545 A * | 3/1989 | Lyle | | 73/152.16 |
| 4,992,656 A * | 2/1991 | Clauser | | 250/251 |
| 5,448,912 A * | 9/1995 | Black | | 73/152.02 |
| 5,821,413 A * | 10/1998 | Chapin | | 73/152.05 |
| 5,963,392 A | 10/1999 | Sri-Jayantha et al. | | |
| 5,970,787 A * | 10/1999 | Wignall | | 73/152.54 |
| 6,014,895 A * | 1/2000 | Vail, III | | 73/382 R |
| 6,450,028 B1 * | 9/2002 | Vail, III | | 73/382 G |
| 6,526,825 B2 * | 3/2003 | Manson | | 73/382 R |
| 7,069,780 B2 * | 7/2006 | Ander | | 73/382 R |
| 7,559,149 B2 * | 7/2009 | Van Kann | | 33/366.25 |
| 7,562,460 B2 * | 7/2009 | Van Kann et al. | | 33/366.25 |
| 7,562,461 B2 * | 7/2009 | Van Kann | | 33/366.25 |
| 7,571,547 B2 * | 8/2009 | Van Kann et al. | | 33/366.25 |
| 7,581,327 B2 * | 9/2009 | Van Kann et al. | | 33/366.25 |
| 7,584,544 B2 * | 9/2009 | Van Kann et al. | | 33/366.25 |
| 7,596,876 B2 * | 10/2009 | Van Kann | | 33/366.25 |
| 7,624,635 B2 * | 12/2009 | Van Kann et al. | | 73/382 R |
| 7,627,954 B2 * | 12/2009 | Van Kann et al. | | 33/366.24 |
| 7,637,153 B2 * | 12/2009 | Van Kann et al. | | 73/382 G |
| 7,714,584 B2 * | 5/2010 | Van Kann | | 324/330 |
| 7,784,343 B2 * | 8/2010 | Van Kann et al. | | 73/382 G |

(Continued)

*Primary Examiner* — Hezron E Williams
*Assistant Examiner* — Samir M Shah
(74) *Attorney, Agent, or Firm* — Altis Law Group, Inc.

(57) ABSTRACT

A gravity sensor includes a chamber, a number of receiving holes, an electrically insulative liquid, a number of pressure sensors, and a number of sealing elements. The receiving holes are defined in the inner surface of the chamber. The electrically insulative liquid is sealed within the chamber. The pressure sensors are disposed in the receiving holes respectively, and are configured for sensing the pressure that the electrically insulative liquid apply thereto. The sealing elements is configured for sealing the receiving holes respectively when the corresponding pressure sensor senses a pressure applied by the electrically insulative liquid.

16 Claims, 3 Drawing Sheets

U.S. PATENT DOCUMENTS

| | | | |
|---|---|---|---|
| 7,788,974 B2 * | 9/2010 | Van Kann et al. | 73/382 R |
| 7,814,790 B2 * | 10/2010 | Van Kann | 73/382 G |
| 7,823,448 B2 * | 11/2010 | Van Kann et al. | 73/382 G |
| 7,823,449 B2 * | 11/2010 | Van Kann et al. | 73/382 G |
| 7,849,739 B2 * | 12/2010 | Van Kann et al. | 73/382 G |
| 7,938,003 B2 * | 5/2011 | Van Kann et al. | 73/382 G |
| 7,942,054 B2 * | 5/2011 | Van Kann et al. | 73/382 G |
| 7,975,544 B2 * | 7/2011 | Van Kann et al. | 73/382 G |
| 7,980,130 B2 * | 7/2011 | Kann et al. | 73/382 G |
| 8,033,170 B2 * | 10/2011 | Van Kann | 73/382 G |
| 8,074,515 B2 * | 12/2011 | Van Kann et al. | 73/382 G |
| 2002/0117001 A1 * | 8/2002 | Manson | 73/382 R |

* cited by examiner

GRAVITY SENSOR AND ELECTRONIC DEVICE USING THE SAME

BACKAGROUND

1. Technical Field

The present disclosure relates to gravity sensors and, particularly, to a high sensitive, low cost gravity sensor and an electronic device using the same.

2. Description of the Related Art

Current gravity sensors are typically 3-axis silicon piezo-resistive accelerometers, which have delicate structures and therefore require complicated manufacture processes. Furthermore, the gravity sensors are commonly made of doped polycrystalline silicon of low piezo-resistive sensitivity, and therefore are not suitable as precision measurement devices.

Therefore, it is desirable to provide a gravity sensor and an electronic device using the same, which can overcome the above-mentioned problems.

BRIEF DESCRIPTION OF THE DRAWINGS

Many aspects of the present gravity sensor and electronic device should be better understood with references to the accompanying drawings. The components in the drawings are not necessarily drawn to scale, the emphasis instead being placed upon clearly illustrating the principles of the present gravity sensor and electronic device. Moreover, in the drawings, like reference numerals designate corresponding parts throughout the several views.

DETAILED DESCRIPTION

Embodiments of the present gravity sensor and electronic device will now be described in detail with references to the drawings.

Figure 1:
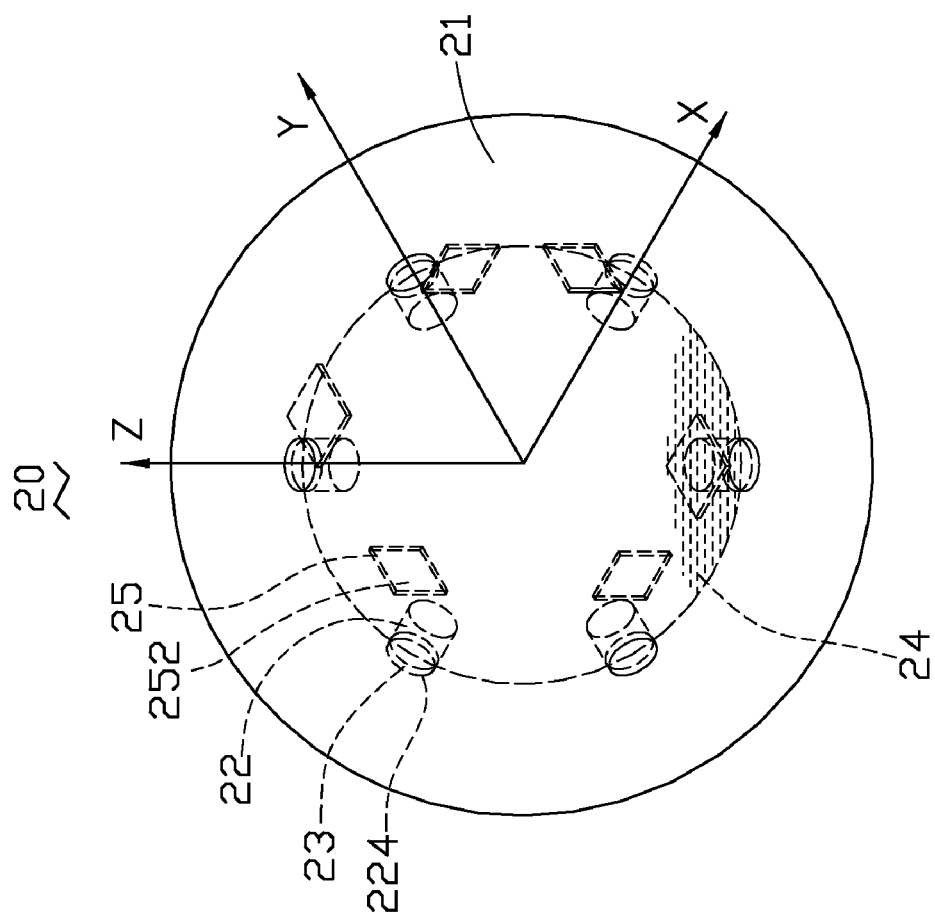
FIG. 1 is a schematic view of a gravity sensor, according to an exemplary embodiment.
Figure 2:
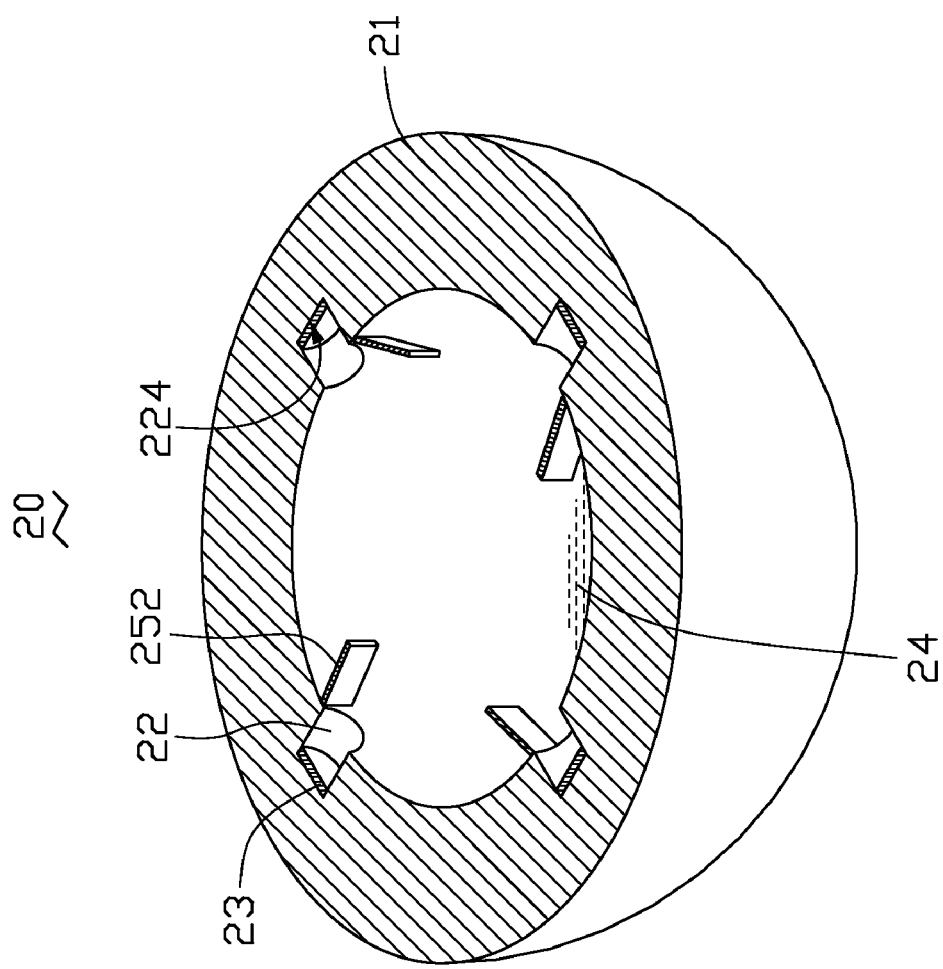
FIG. 2 is an isometric, cross-sectional view taken along X-Y plane of FIG. 1.

Referring to FIGS. 1 and 2, a gravity sensor 20, according to an exemplary embodiment, includes a chamber 21, an electrically insulative liquid 24, a number of pressure sensors 23, and a number of sealing elements 25. The chamber 21 defines a number of receiving holes 22 in the inner surface thereof. The electrically insulative liquid 24 is sealed within the chamber 21. The pressure sensors 23 are disposed in the receiving holes 22, and are configured for sensing the pressure applied by the electrically insulative liquid 24. The sealing elements 25 are configured for sealing the receiving holes 22 when the corresponding pressure sensor 23 senses a pressure applied by the electrically insulative liquid 24.

In this embodiment, the chamber 21 is a hollow sphere, the thickness of the outer shell is 1/5 of the radius.

The number of the receiving holes 22 is six. The receiving holes 22 are distributed uniformly and symmetrical around the inner space of the chamber 21 and dispersed at the six corners of an imaginary octahedral confined by the chamber 21. Thus, the six receiving holes 22 define an orthogonal X, Y, Z-axis coordinate. However, the receiving holes 22 are not limited by this embodiment, but can be configured depending on requirements. For example, in other alternative embodiments, the number of the receiving holes 22 can be four. The four receiving holes 22 define an orthogonal X, Y, axis coordinate. The shape and the size of the receiving holes 22 are the same.

The height of the electrically insulative liquid 24 is less than two-fifths of the height of the inner space of the chamber 21 to prevent two of the receiving holes 22 from being filled with the electrically insulative liquid 24 simultaneously.

The number of the pressure sensors 23 corresponds to the number of received holes 22, which is six, in this embodiment. The pressure sensors 23 are disposed on the bottom surface 224 of the receiving holes 23, and are configured for sensing the pressure applied by the electrically insulative liquid 24 and outputting a signal to the sealing elements 25.

The number of the sealing elements 25 is six too. In this embodiment, the sealing elements 25 are electrically connected to a corresponding pressure sensor 23 for receiving the output signal. The sealing elements 25 including a sealing cover 252 and a controller (not shown) configured for receiving the signal transmitted from a corresponding pressure sensor 23 and controlling the sealing cover 252 to uncover or hermetically cover a corresponding receiving hole 23. Initially, the sealing cover 252 is in an uncover position. When the gravity sensor 20 moves or is in motion, the electrically insulative liquid 24 flows into a receiving hole 22, the controller of the sealing element 25 receives the signal transmitted from the pressure sensor 23 and controls the sealing cover 252 to hermetically cover the receiving hole 22, thus sealing a predetermined amount of electrically insulative liquid 24 within the receiving holes 22. As the gravity sensor 20 continues moving, the electrically insulative liquid 24 may flow into another receiving hole 22. As a result, the controller of this other sealing element 25 receives an output signal and controls the corresponding sealing cover 252 to hermetically cover this new receiving hole 22 and uncovers the previously covered receiving hole 22.

In use, if the gravity sensor 20 is dropped to the ground, the electrically insulative liquid 24 will flow into the receiving hole 22 which is facing downwards. The corresponding sealing element 25 controls the sealing cover 252 to cover the receiving hole 22. Thereby, the pressure exerted by the gravitational force of the electrically insulative liquid 24 to the pressure sensors 23 has a fixed value. In free fall, the force N that the pressure sensor 23 senses and the gravitational force of the electrically insulative liquid 24 must satisfy the formula: $F=N-mg=ma$, where, m is the weight of the electrically insulative liquid 24 received in the receiving hole 22, g is acceleration due to gravity, and a is acceleration of the gravity sensor 20, thus the acceleration a can be calculated.

Figure 3:
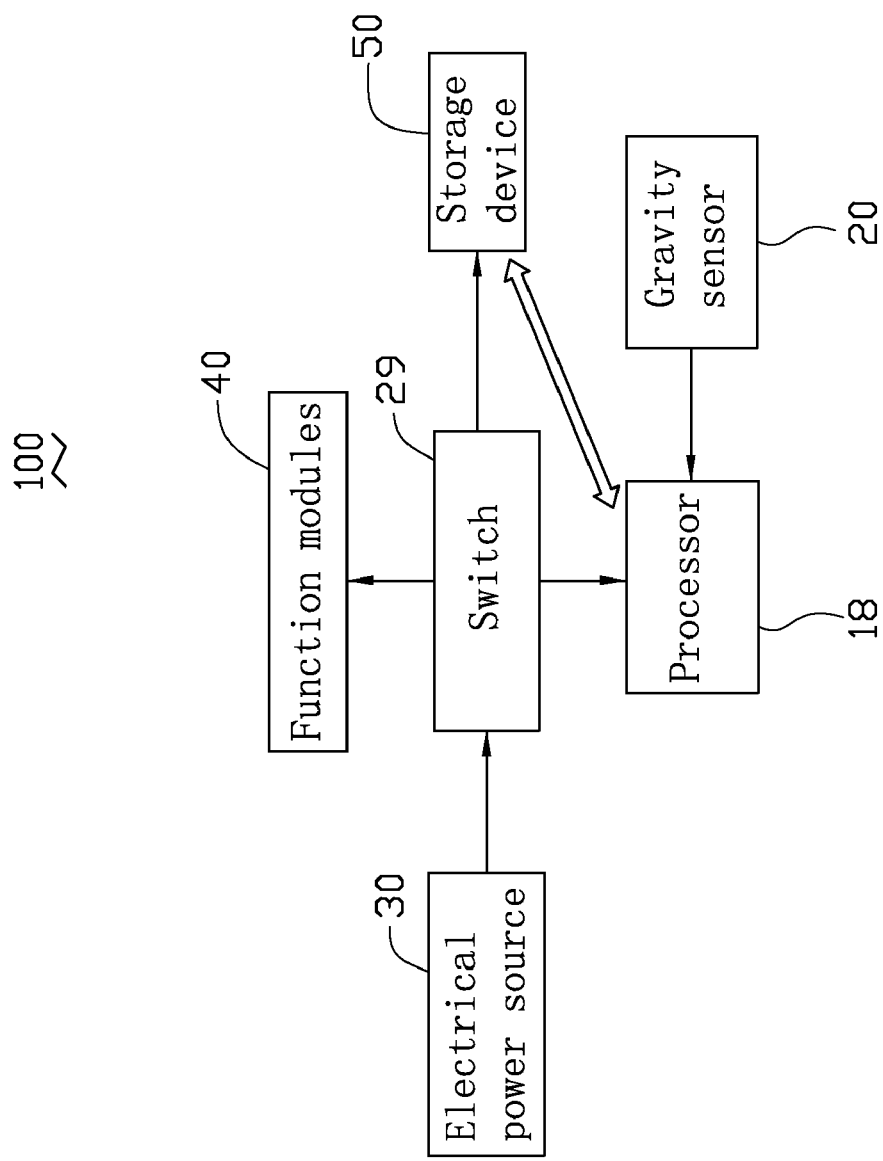
FIG. 3 is a functional block diagram showing components of a portable electronic device including gravity sensor, according to a present embodiment.

Referring to FIG. 3, an electronic device 100 using the gravity sensor 20 further includes a processor 18, a switch 29, a electrical power source 30, functional modules 40 (only one is shown), and a storage device 50.

The electronic device 100 can be a computing device such as a notebook/portable computer or a personal digital device (PDA), a communication device such as a wireless telephone, or a media device such as a CD, a DVD, or an MP3 player. The processor 18, the functional modules 40, and the storage device 50 are electrically connected to the electrical source 30, via the switch 29. The electrical power source 30, e.g., a battery or other rectified alternating current (AC) power source, provides electrical power for the electronic device 100. The functional modules 40 are configured for carrying out a variety of functions of the electronic device 100. For example, the functional modules 40 can include an audio transceiver (e.g., phone), a camera module, a LCD monitor, and so on. The storage device 50 is configured for storing data from the portable electronic device 100.

The gravity sensor 20 is fixed in the electronic device 100. For example, the gravity sensor 20 can be secured to a shell/cover or a circuit board of the electronic device 100. Thereby, the gravity sensor 20 is capable of measuring an acceleration of the electronic device 100 and generate a signal proportional corresponding to the acceleration. The signal can be a voltage signal, or other indicators, e.g. current, proportional to the acceleration.

The processor 18 can receive the signal, corresponding to the acceleration generated by the gravity sensors 20, and compare the received signal with a preset value to compute whether the electronic device is in rapid acceleration such as being dropped. The acceleration level could be a measurement of a rapid acceleration that approaches the value of the acceleration due to gravity. The present value can be set based on a maximum force of impact that the electronic device 100 can withstand (i.e., a short-distance drop might be deemed acceptable). If the acceleration level (e.g., an absolute value of acceleration) of the electronic device 100 is determined to be greater than the acceleration level of the preset value, such as in a free fall, the processor 18 activates the switch 29 to shut down the electronic device 100 to prevent the electronic device 100 from being damaged from any impact forces. In the electronic device 100, the processor 18 continuously monitors the signal generated by the gravity sensor 20.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A gravity sensor comprising:
    a chamber;
    a plurality of receiving holes defined in an inner surface of the chamber;
    an electrically insulative liquid sealed within the chamber;
    a plurality of pressure sensors respectively disposed in the respective receiving holes and configured for sensing a pressure that the electrically insulative liquid applies thereto; and
    a plurality of sealing elements for sealing the respective receiving hole(s) when the corresponding pressure sensor(s) sense(s) the pressure applied thereto by the electrically insulative liquid, the gravity sensor configured for measuring an acceleration value of the gravity sensor based on the pressure and generating a signal proportionally corresponding to the acceleration value.

2. The gravity sensor as claimed in claim 1, wherein the chamber is a hollow sphere.

3. The gravity sensor as claimed in claim 1, wherein said plurality of receiving holes comprises six receiving holes arranged symmetrically around said inner surface of the chamber and dispersed at six corners of an imaginary octahedral confined by the chamber, and further wherein said six receiving holes define respective orthogonal X, Y, Z-axis coordinates.

4. The gravity sensor as claimed in claim 1, wherein said plurality of receiving holes comprises four receiving holes defining respective X, Y-axis coordinates.

5. The gravity sensor as claimed in claim 1, wherein said electrically insulative liquid occupies less than two-fifths of a total height of the inner surface of the chamber.

6. The gravity sensor as claimed in claim 1, wherein said corresponding pressure sensor outputs a signal when the electrically insulative liquid applies a pressure thereto.

7. The gravity sensor as claimed in claim 1, wherein the sealing element comprises a sealing cover and a controller, said corresponding pressure sensor outputs a signal when a pressure is sensed, the controller being configured for receiving said signal and controlling a corresponding sealing cover hermetically covering and uncovering a corresponding receiving hole.

8. A portable electronic device comprising:
    a gravity sensor configured for measuring an acceleration value of the portable electronic device and generating a signal proportionally corresponding to the acceleration value, the gravity sensor including a chamber, a plurality of receiving holes, an electrically insulative liquid, a plurality of pressure sensors and a plurality of sealing elements, the receiving holes defined in an inner surface of the chamber, the electrically insulative liquid sealed within the chamber, the plurality of pressure sensors respectively disposed in respective receiving holes and configured for sensing a pressure that the electrically insulative liquid applies thereto, the sealing elements for sealing the respective receiving hole(s) when the corresponding pressure sensor(s) sense(s) the pressure applied thereto by the electrically insulative liquid;
    an electrical power source for providing electrical power for the electronic device;
    a processor configured for receiving the acceleration value generated by the gravity sensor, and comparing the acceleration value with a preset value in order to compute whether an unacceptable acceleration is occurring, the acceleration value being based on the pressure, the processor being further configured for activating a switch to shut down the electronic device if the unacceptable acceleration is detected; and
    the processor is connected to the electrical power source via the switch.

9. The portable electronic device as claimed in claim 8, wherein the chamber is a hollow sphere.

10. The portable electronic device as claimed in claim 8, wherein said plurality of receiving holes comprises six receiving holes arranged symmetrically around said inner surface of the chamber and dispersed at six corners of an imaginary octahedral confined by the chamber, and further wherein said six receiving holes define respective orthogonal X, Y, Z-axis coordinates system.

11. The portable electronic device as claimed in claim 8, wherein said plurality of receiving holes comprises four receiving holes defining respective X, Y-axis coordinates.

12. The portable electronic device as claimed in claim 8, wherein said electrically insulative liquid occupies less than two-fifths of a total height of the inner surface of the chamber.

13. The portable electronic device as claimed in claim 8, wherein each of the plurality of sealing elements comprises a sealing cover and a controller, said corresponding pressure sensor outputs a signal when a pressure is sensed, the controller being configured for receiving said signal and hermetically covering or sealing the corresponding receiving hole and uncovering a previously covered receiving hole.

14. The portable electronic device as claimed in claim 8, wherein the signal proportionally corresponding to the acceleration value generated by the gravity sensor is a voltage signal or a current signal.

15. The portable electronic device as claimed in claim 8, wherein the processor is configured to compute whether an unacceptable acceleration is occurring by determining if the acceleration value of the portable electronic device is greater than the preset value.

16. The portable electronic device as claimed in claim 8, wherein the electronic device further includes a storage device, the storage device is configured for storing data from the portable electronic device.

* * * * *